(12) United States Patent
Keel et al.

(10) Patent No.: US 9,449,109 B1
(45) Date of Patent: Sep. 20, 2016

(54) VISUALIZING, SHARING AND MONETIZING MULTIMEDIA CONTENT

(75) Inventors: Paul Erich Keel, Cambridge, MA (US); David Birnbach, Andover, MA (US); Matthew Sither, Swampscott, MA (US)

(73) Assignee: Eversitas, LLC, Cambridge, MA (US)

( * ) Notice: Subject to any disclaimer, the term of this patent is extended or adjusted under 35 U.S.C. 154(b) by 521 days.

(21) Appl. No.: 13/602,458

(22) Filed: Sep. 4, 2012

Related U.S. Application Data

(63) Continuation-in-part of application No. 12/793,207, filed on Jun. 3, 2010, now Pat. No. 8,701,018, which is a continuation-in-part of application No. 12/563,416, filed on Sep. 21, 2009, now Pat. No. 8,499,248, which is a continuation-in-part of application No. 11/118,301, filed on Apr. 29, 2005, now Pat. No. 7,640,511.

(60) Provisional application No. 60/566,723, filed on Apr. 29, 2004, provisional application No. 61/116,747, filed on Nov. 21, 2008, provisional application No. 61/262,827, filed on Nov. 19, 2009, provisional application No. 61/554,198, filed on Nov. 1, 2011, provisional application No. 61/531,039, filed on Sep. 5, 2011, provisional application No. 61/637,016, filed on Apr. 23, 2012.

(51) Int. Cl.
| | | |
|---|---|---|
| G06F 17/30 | (2006.01) | |
| G06Q 30/02 | (2012.01) | |
| G06Q 10/10 | (2012.01) | |
| H04N 21/482 | (2011.01) | |

(52) U.S. Cl.
CPC .......... *G06F 17/3087* (2013.01); *G06Q 10/10* (2013.01); *G06Q 30/0277* (2013.01); *H04N 21/4821* (2013.01); *Y10S 707/99933* (2013.01); *Y10S 707/99943* (2013.01)

(58) Field of Classification Search
CPC .. G06Q 30/0277; G06Q 10/10; G06F 3/167; G06F 17/30044; G06F 17/30056; G06F 17/3087; H04N 21/4821; Y10S 707/99943; Y10S 707/99933
USPC ........ 715/717, 727, 792, 835–839, 861, 962
See application file for complete search history.

(56) References Cited

U.S. PATENT DOCUMENTS

| | | | | |
|---|---|---|---|---|
| 6,725,203 | B1 * | 4/2004 | Seet et al. .................. | 705/14.53 |
| 2002/0082930 | A1 * | 6/2002 | Park ............................... | 705/26 |

(Continued)

OTHER PUBLICATIONS

Johnson et al., "Music as an Input Device", Proceedings of the IEEE Virtual Reality 2004 Workshop Beyond Wand and Glove Based Interaction, Sunday, Mar. 28, 2004 Chicago, Illinois, pp. 39-42.*

(Continued)

*Primary Examiner* — Andrew Tank
(74) *Attorney, Agent, or Firm* — Chapin IP Law, LLC

(57) ABSTRACT

A system provides exchange and display of information among a group of users based on creation, arranging, sharing and exchange of tiles. The system further provides connecting advertisements to tiles, displaying the advertisement when tiles are accessed, monetizing the advertisement and adding visual effects to the display of the advertisement.

20 Claims, 14 Drawing Sheets

(56) References Cited

U.S. PATENT DOCUMENTS

| | | | |
|---|---|---|---|
| 2003/0020671 A1* | 1/2003 | Santoro et al. | 345/1.3 |
| 2003/0078791 A1* | 4/2003 | Tufte | 705/1 |
| 2003/0167315 A1* | 9/2003 | Chowdhry et al. | 709/218 |
| 2004/0098360 A1* | 5/2004 | Witwer et al. | 707/1 |
| 2004/0148228 A1* | 7/2004 | Kwei | 705/26 |
| 2004/0268413 A1* | 12/2004 | Reid et al. | 725/131 |
| 2005/0038698 A1* | 2/2005 | Lukose et al. | 705/14 |

OTHER PUBLICATIONS dev-gallery.com, "Writing your first render function", http://www.dev-gallery.com/programming/opengl/winamp/tutorial1/two.htm, Feb. 22, 2004, as evidenced by the Internet Archive Wayback Machine at https://web.archive.org/web/20040222164842/http://www.dev-gallery.com/programming/opengl/winamp/tutorial1/two.htm.*

\* cited by examiner

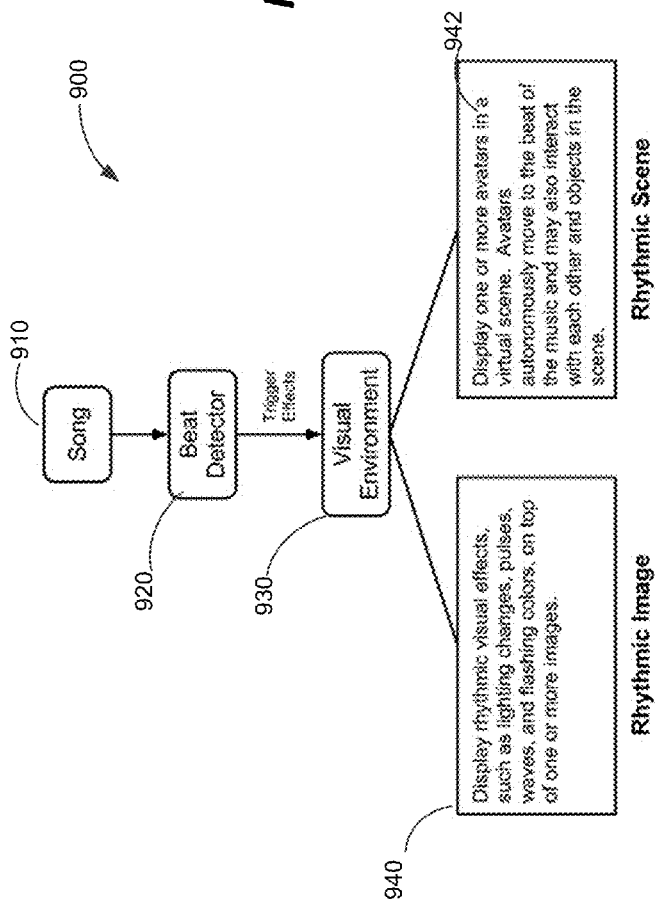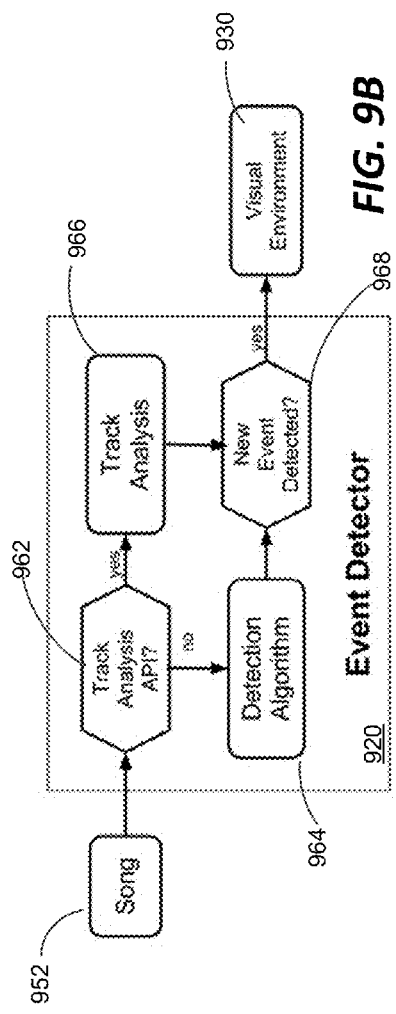
FIG. 9A
FIG. 9B

1210
EXTRACT FEATURES FROM AUDIO COMPONENT

1310
PROCESS THE AUDIO STREAM AS IT PLAYS AND EXTRACT FEATURES IN REAL TIME

1320
COMPILE A FEATURE LIST AHEAD OF TIME BY ALLOWING A USER TO LISTENS TO THE AUDIO COMPONENT AND PROVIDING A GRAPHICAL USER INTERFACE (GUI) FOR ENABLING THE USER TO MARK FEATURES

1330
PRE-ANALYZE THE AUDIO COMPONENT

*FIG. 13*

VISUALIZING, SHARING AND MONETIZING MULTIMEDIA CONTENT

RELATED APPLICATIONS

This application is a continuation-in-part of earlier filed co-pending U.S. patent application Ser. No. 12/793,207 entitled METHODS AND APPARATUS FOR MANAGING INFORMATION OBJECTS IN AN ELECTRONIC PERSONAL INFORMATION MANAGEMENT SYSTEM, filed Jun. 3, 2010 now U.S. Pat. No. 8,701,018 which is a continuation-in-part of earlier filed co-pending U.S. patent application Ser. No. 12/563,416 METHODS AND APPARATUS FOR MANAGING AND INFERRING RELATIONSHIPS FROM INFORMATION OBJECTS filed Sep. 21, 2009 now U.S. Pat. No. 8,499,248 which is a continuation in part of earlier filed U.S. patent application Ser. No. 11/118,301, now U.S. Pat. No. 7,640,511 and entitled "METHODS AND APPARATUS FOR MANAGING AND INFERRING RELATIONSHIPS FROM INFORMATION", filed Apr. 29, 2005 and issued Dec. 29, 2009, which application claims the benefit of the filing date of earlier filed U.S. Provisional Patent Application having Ser. No. 60/566,723 entitled "METHODS AND APPARATUS FOR MANAGING AND INFERRING RELATIONSHIPS FROM INFORMATION," filed Apr. 29, 2004 and of earlier filed U.S. Provisional Patent Application having Ser. No. 61/116,747 entitled "INFORMATION OBJECTS (IOS) AND INFORMATION VIEWS (IVS)," filed Nov. 21, 2008 that shares co-inventorship with the present application and earlier filed U.S. Provisional Patent Application having Ser. No. 61/262,827 entitled "INFORMATION CONTAINERS," filed Nov. 19, 2009. This application is related to U.S. patent application having Ser. No. 12/916,693, entitled "SYSTEM AND METHODS FOR REMOTE COLLABORATIVE INTELLIGENCE ANALYSIS," filed Nov. 1, 2010.
The entire teachings and contents of these Patent Applications are hereby incorporated by reference herein in their entireties.

STATEMENT REGARDING FEDERALLY SPONSORED RESEARCH

This invention was made with government support under government grant (N00014-08-C-0206). The Government may have certain rights in this invention

PRIORITY TO EARLIER FILED PROVISIONAL PATENT APPLICATIONS

This application claims the benefit of the filing date of: earlier filed pending U.S. Provisional Patent Application having Ser. No. 61/554,198 entitled "INTEGRATED DIGITAL ADVERTISING", filed Nov. 1, 2011; earlier filed pending U.S. Provisional Patent Application having Ser. No. 61/531,039 entitled "AN INTEGRATED SOFTWARE PLATFORM FOR ADVERTISING-SUPPORTED MULTIMEDIA CONTENT", filed Sep. 5, 2011; earlier filed pending U.S. Provisional Patent Application having Ser. No. 61/637,016 entitled "METHODS AND APPARATUS FOR VISUALIZING, SHARING AND MONETIZING MULTIMEDIA CONTENT", filed Apr. 23, 2012. The entire teachings and contents of these Patent Applications are hereby incorporated by reference herein in their entirety.

BACKGROUND

Modern information processing systems allow users to collect and process large amounts of information. As an example, a typical computer system such as a personal computer includes an operating system that executes within the computer system to provide a graphical user interface to users of that computer system. A conventional graphical user interface typically includes a number of information objects such as graphical icons that represent information of relevance or importance to the user. The user accesses data and controls functionality of the computer system by selecting and operating such icons. By way of example, software applications such as word processors, graphical editing tools, web browsers and many others often provide graphical user interfaces that include a number of icons that have visual meaning to the user of the computer system. Typically, a software application renders icons to allow the user to invoke specific functionality or commands of that application and/or to allow the user to organize and access data. Many software applications use icons to represent data or files that the user can access by selecting (e.g., clicking) the icon representing the data. As an example, if a user selects an icon that represents a software application installed within the computer, the computer will begin execution of that application. Other icons on a graphical user interface can represent folders or files maintained by the operating system within a file system.

Many conventional software applications allow a user to develop or collect various portions of information or content for storage and future access. As an example, a word processor or other editing tool allows the user to create and edit documents. As another example, a web browser allows a user to navigate web pages provided by servers on remote computer networks such as the Internet to reference information on a variety of subjects. A conventional computer system allows a user to store information referenced or created by such applications as a set of documents or files that can be retrieved by the user at a later time.

Most conventional operating systems and many software applications also provide a way for a user to arrange a file system of the computer in order to organize documents and files in a manner that makes sense to the user. Computer operating systems typically organize file systems in a hierarchical manner allowing the user to create folders or directories with user-specified names. The user can store files within the folders in a manner that makes sense to that user. A file system is thus one of the most popular ways for users to organize and manage data and information of interest to those users.

Another mechanism that conventional applications and operating systems provide to allow users to organize and manage information of interest to that user is the ability to allow a user to spatially arrange information objects such as graphical icons in a way that makes intuitive sense to the user. As an example, on a conventional "desktop" work area provided by many operating systems, a user can place or position icons representing files, documents, applications, email messages, appointments or the like in any manner and at any position that the user may choose. In particular, such conventional applications allow the user to graphically maneuver the icons into position in relation to one another in a manner that makes sense to that user. Different users often organize icons on their desktop in different ways.

Information availability and accessibility is continuously increasing. The problem is that information commonly exists in different formats, resides in different locations, is dynamically changing, and is used and modified by different people. This makes it difficult for users to effectively monitor, analyze and exchange information.

A lot of content is published through social networks such as Facebook, Twitter, Tumbler and Pinterest. These applications commonly present content as feeds (dynamic and non-modifiable sequences of information). One alternative to feeds are web pages (static and controlled arrangements of information) such as CNN and Amazon. The advantages of feeds over web pages are that they can be operated quickly, simply and inexpensively. New content can easily be added, individual content items can easily be recombined, and content is automatically laid out chronologically. The disadvantages of feeds over web pages are that users cannot change and modify content, and have no control over how content is visualized and organized. The advantages and disadvantages of feeds and web pages often depend on the particular use case. For example, a blog is best presented as a sequence organized by time while a store front benefits from a more customized presentation of product offerings.

A large amount of high-quality content is accessible through web sites. The content on these web sites is often difficult to access and reuse because individual web sites organize and present content differently and because content is stored in different formats. Furthermore, content is often reused illegally and authorship information often (unintentionally) obscured.

Consumers increasingly expect content to be free and a growing amount of content is being distributed illegally. At the same time, revenue derived from the distribution of content (such as advertising) goes mostly to content distributors and curators (e.g. social networking sites such as Facebook and search engines such as Google) rather than content owners. There are few opportunities for individual content owners to independently distribute and monetize their content.

The size of content is decreasing (e.g. a pager versus a book or a music track versus a music album, a news article versus a newspaper) yet there are few technology solutions that support the effective distribution, recombination and monetization of smaller content pieces.

People often do not have the skills and time to present content in a professional and impressive manner. Thus, tools that offer fewer options to publish content (such as most social networking sites) often appear less intimidating, more democratic and content focused. These tools provide users with an excuse for not spending a lot of time on the presentation of content as they operate within given parameters like everybody else (talented and untalented, rich and poor). Compare the 140 word limitation on Twitter, the predefined picture presentation in Pinterest, and the standardized posts on Facebook walls with the effort to build custom web pages.

The meaning of content is often defined by the context in which it is created or used in (e.g. considering fruits in the context of nutrition values are different from considering fruits in the context of investment opportunities). The distribution of individual content pieces often obscures the context in which the content piece was previously used in. Also, content is often disassociated from the background and expertise of content creators and content users eliminating valuable means for people to help each other understand the various meanings and uses of content.

SUMMARY

Embodiments disclosed herein enable users to quickly and easily transform different types of multimedia content into modular, interactive and web accessible collages as an alternative to conventional web pages. These embodiments empower consumers to become active curators and distributors of multimedia content, enable instant social networking and instant monetization of content, make advertisements an interactive, adaptive and integral part of the entertainment experience. The embodiments create a direct relationship between a particular piece of content and an advertisement, synchronize advertisements with music content, create a new content distribution monetization paradigm where most advertising revenue flows back to the content owners, allow anybody to generate revenue from their content and the contents of other people.

One exemplary technique for presenting and sharing multimedia content includes the steps of providing a user interface for connecting the multimedia content. The interface includes features for representing content as "tiles," creating tiles, associating tiles with metadata, arranging the plurality of tiles on an interactive wall, connecting an advertisement to at least one of the plurality of tiles and sharing the tiles. The technique further includes displaying the multimedia content connected to the at least one of the plurality of tiles on the interactive wall, connecting an advertisement to at least one of the plurality of tiles and displaying the advertisement when at least one of the plurality of tiles is accessed. Such a system maintains a connection between content and content monetization options (such as an advertisement) when content is shared (transferred between interfaces and people).

Other techniques disclosed herein include monetizing the advertisement connected to at least one of the plurality of tiles, providing a user interface to allow a user to interact with and customize the visual effects, displaying a donate button in response to user activation, the button displayed whenever at least one of the plurality of tiles is accessed, computing a shared revenue amount collected through revenue sharing option in response to user activation and enabling direct sales of products displayed on at least one of the plurality of tiles in response to the user specifying pricing and delivery options. Such techniques enhance monetizing the tile content and assure the fair distribution of revenue of shared content as well as the preservation of authorship and copyright information.

With the globalization of media and tools that deliver information instantly, there are proliferation of static and dynamic information in the form of multimedia such as sensor data, maps, intelligence reports, blogs, social networking and news feeds, videos, diagrams and photographs. Users can greatly benefit from the use of this information. However, they will likely be overwhelmed by the widening range of diverse information sources and formats. In one embodiment, a PinBit Robot handles the rich yet disparate resources of content across different platforms and addresses these problems by offering innovative visual analytics and artificial intelligence solutions to reduce the cognitive burden of users and to help users to quickly, easily and creatively explore disparate information sources. The primary objective is to visualize search results as interactive multimedia collages that exploit the expert's creative abilities to detect non-obvious relationships between information.

Web based technology for anybody to quickly and easily create collages of multimedia content (pictures, music, videos, events, promotions). Every new collage instantly enables social networking and revenue generation. Every piece of content can be discussed and reposted, enables viewers to make donations and purchase products, and enables advertisers to directly post (conventional and music synchronized) advertisements to individual pieces of content.

Embodiments described herein provide several advantages for content owners and advertisers, including but not limited to:

Enabling static websites to be transformed into dynamic and interactive Walls;
Directly connecting content and advertisements, and maintaining these connections when the content is shared;
Increasing revenue when content is shared;
Enabling advertisements to be music-synchronized and gamified;
Enabling advertisements to establish a real time connection between the advertiser and consumer;
Providing that most advertising revenue flows back to content owners for content consumers and curators;
Enabling content from provider and advertiser Walls to be copied to consumer and curator Walls;
Enabling third party content to easily be imported into consumer and curator Walls;
Enabling consumer and curator Walls and Wall contents to easily be shared;
Enabling Walls to become Visual Playlists that consist of multi-media contents including videos, music, and pictures;
Allowing animated advertisements to be modified and shared; and
Enabling consumer relevant content to automatically be assembled based on user actions and preferences.

Embodiments of the invention include any type of computerized device, workstation, handheld or laptop computer, or the like configured with software and/or circuitry (e.g., a processor) to process any or all of the method operations disclosed herein. In other words, a computerized device or a processor that is programmed or configured to operate as explained herein is considered an embodiment of the invention.

Other embodiments of the invention that are disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor and a display, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein. Other configurations include various graphical representations of the IOs themselves, for example as displayed on a graphical user interface as will be explained in more detail.

It is to be understood that the system of the invention can be embodied strictly as a software program, as software and hardware, or as hardware alone such as within a processor, or within an operating system or within a software application.

BRIEF DESCRIPTION OF THE DRAWINGS

The foregoing and other objects, features and advantages of the invention will be apparent from the following more particular description of embodiments of the invention, as illustrated in the accompanying drawings and figures in which like reference characters refer to the same parts throughout the different views. The drawings are not necessarily to scale, with emphasis instead being placed upon illustrating the embodiments, principles and concepts of the invention.

FIG. 9A is a block diagram 900 of the Ad-Sync architecture in accordance with one example embodiment disclosed herein.

FIG. 9B is a block diagram 950 of the Ad-Sync Event Detector process of FIG. 9A.

FIG. 12-13 are flow charts of processing steps performed to extract features from audio components and applying visual effects to animate images in accordance with embodiments disclosed herein.

DETAILED DESCRIPTION

Embodiments disclosed herein (also referred to as the PinBit system) enable users to quickly and easily transform different types of multimedia content into modular, interactive, sharable, monetizable and web accessible collages. These collages (referred to as tiles and walls) are potential substitutes for conventional web pages and social networking sites. Tiles are flexible data structures and can include data files, references to data files as well as metadata. The PinBit system has several advantages over for conventional web pages and social networking sites as described below in Table 1. The PinBit system is a hybrid between social networking sites and web pages and provides the best of both. PinBit presents the next chapter in the evolution of social networking sites and the web.

TABLE 1

Comparison of PinBit system to Social Networks and Websites

| Content | Social Networks | Web Sites | PinBit |
|---|---|---|---|
| Post | Easy | Difficult | Easy |
| Re-Post | Easy | Difficult | Easy (Wall to Wall) |
| Interact (Comment, Rate, etc.) | Easy | Difficult | Easy |
| Control Layout | Difficult | Easy | Easy (LEGO) |
| Control Monetization | Difficult | Easy | Easy |
| Auto-Layout | Yes | No | Yes |
| Standardized Information Format (for web content) | Yes | No | Yes |

Figure 1:
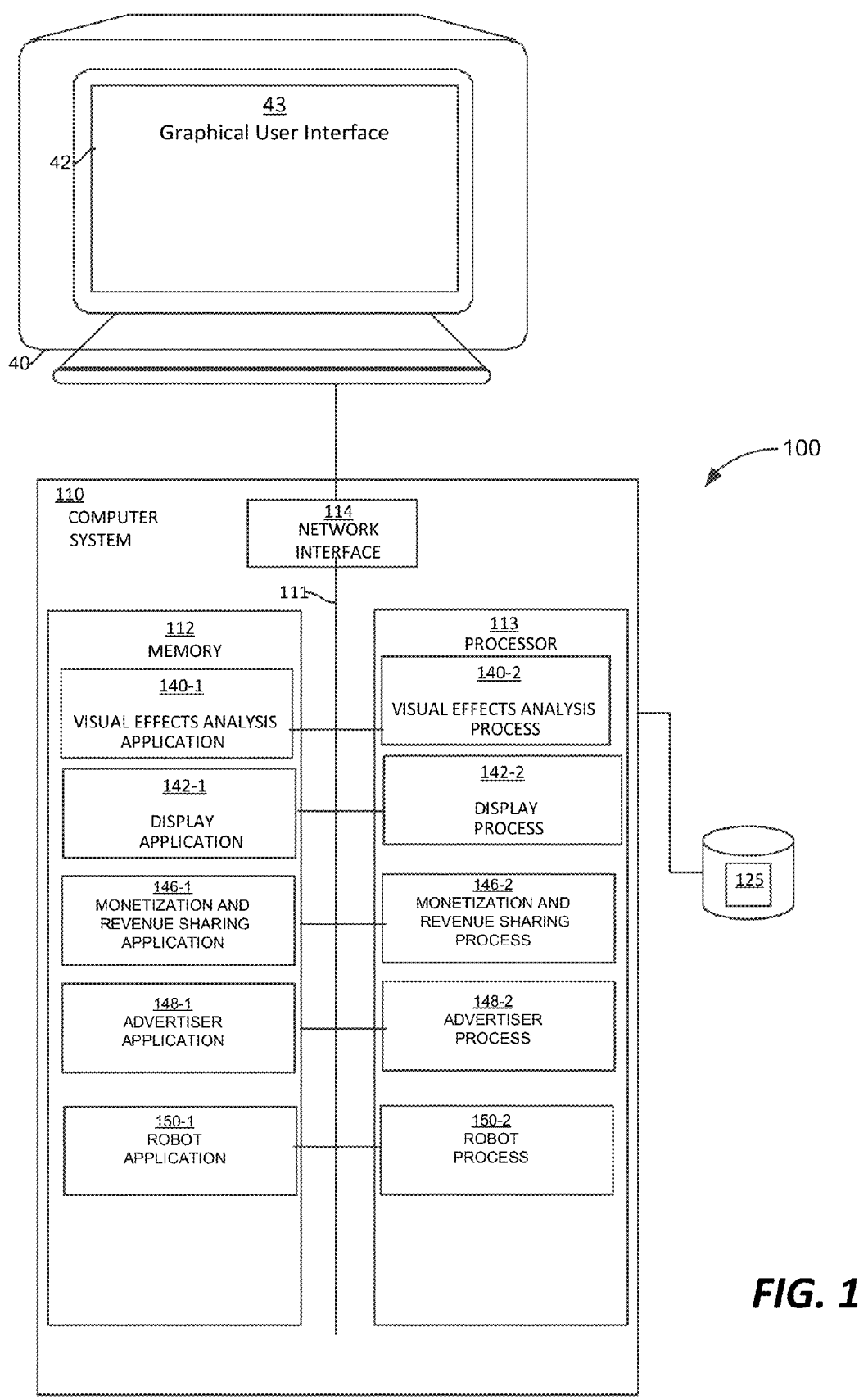
FIG. 1 is an example network environment including computer systems configured with Tile System applications in accordance with one example embodiment disclosed herein.

FIG. 1 illustrates one embodiment of system 100 (also referred to as PinBit system 100 or simply PinBit 100). The PinBit system 100 can operate in a computer-networking environment which includes a network 101 such as a local area network (e.g., LAN) that can interconnect a plurality of computer systems, servers, personal computers (PCs), laptops, workstations, mainframe terminals, or the like. The computer systems 110 may be any type of computerized device such as a personal computer, laptop, workstation, mainframe terminal, or the like. In this example, the PinBit system 100 includes at least one computer system 110 (also referred to as server 110) which generally includes in interconnection mechanism 111 such as a data bus, motherboard or other circuitry that interconnects a memory 112, a processor 113, an network interface 114 and a communications interface 115. The network interface 114 allows communication with other computer systems, here for example PC 40. PC 40 can include a monitor 42 which can display a Graphical User Interface (GUI) 43. The GUI 43 can be provided by the PinBit system 100, for example, by running a browser on PC 40. The architecture of the computer system 110 is shown in FIG. 1 by way of example only. It is to be understood that the details of the example computer system 110 be can vary and include other components.

The memory 112 within each computer system 110 may be any type of computer readable medium such as random access memory (RAM), read only memory (ROM). The memory 112 may be fixed or removable from the computer system 110, such as a floppy disk, magnetic disk, optical disk media (e.g., CD ROM) or the like.

In one embodiment, the memory 112 is encoded with computer program logic (e.g., software code) that includes a visual effects analysis application 140-1, a display application 142-1, a monetization and revenue sharing application 146-1, an advertiser application 148-1 and a robot application 150-1. When the processor 113 executes the visual effects analysis application 140-1, the processor 113 produces a visual effects analysis process 140-2 that executes as explained herein to produce visual effects in conjunction with displayed advertisements.

When the processor 113 executes the display application 142-1, the processor 113 produces a display process 142-2 that executes as explained herein to produce the graphical user interface (GUI) 43 for viewing by a user which can be displayed on PC 40. The operation of display process 142-2 and display application 142-1 are collectively referred to herein as the display 142 or simply the GUI 43. When referring to the display 142, it can thus be a reference to the executing process 142-2, the application code 142-1, or both.

When the processor 113 executes the monetization and revenue sharing application 146-1, the processor 113 produces monetization and revenue sharing process 146-2 that executes as explained herein to support monetizing advertisements and sharing revenue between users and advertisers. When the processor 113 executes the advertiser application 148-1, the processor 113 produces the advertiser process 148-2 that executes as explained herein to support advertisers bidding to connect advertisements to tiles. When the processor 113 executes the robot application 150-1, the processor 113 produces the robot process 150-2 that executes as explained herein to support the PinBit robot, filter and discoverer features.

The database 125 maintains a history of updates to the tiles to allow for inclusive reconstruction of a particular tile at given time. The database 125 supports the visual effects analysis application 140-1, the display application 142-1, the monetization and revenue sharing application 146-1 and the advertiser application. It is to be understood that the system 100 described herein may be distributed or centralized and may operate among many computer systems with many users.

Figure 2:
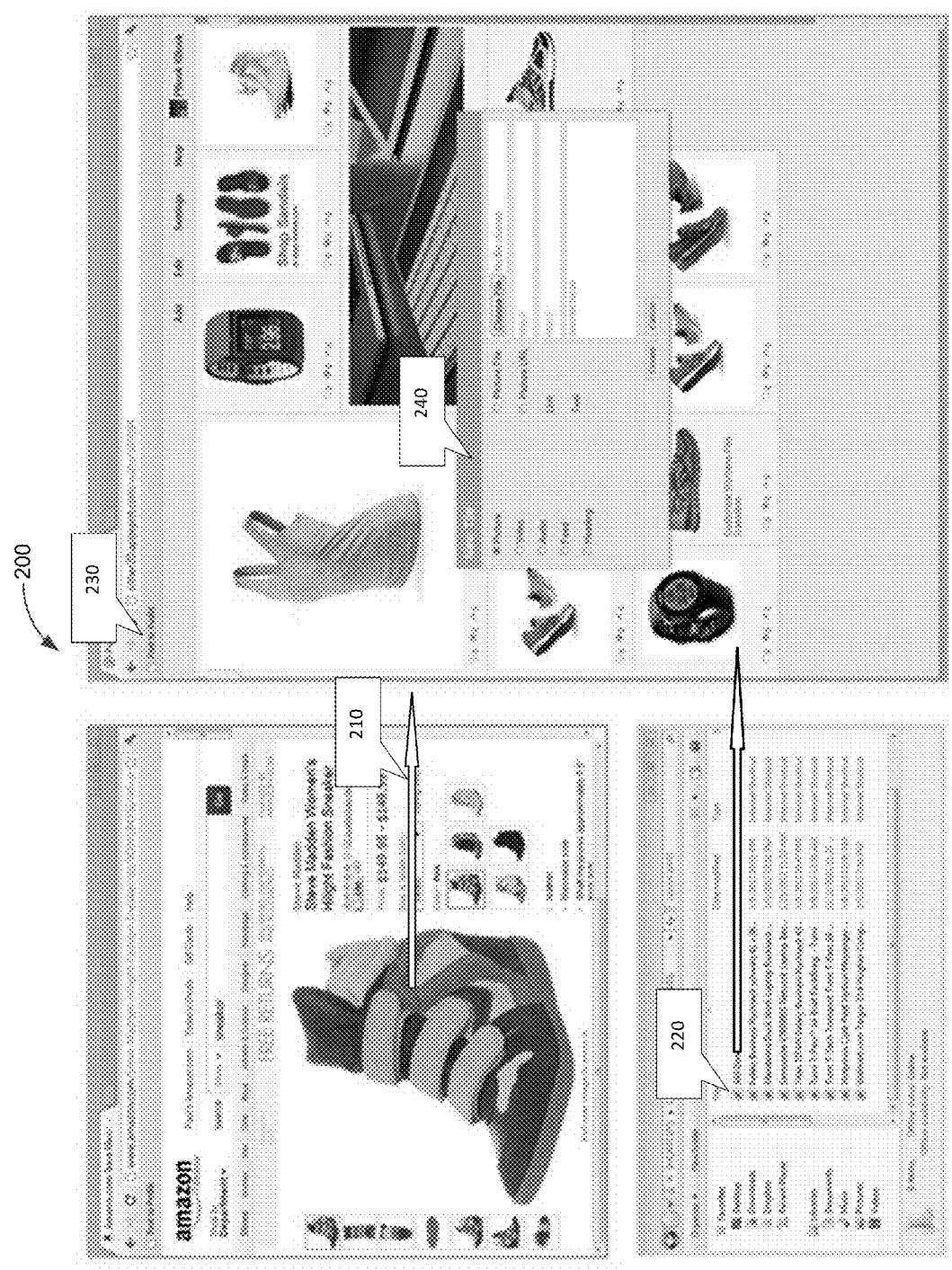
FIG. 2 shows an example of creating tiles on a wall in accordance with one example embodiment disclosed herein.

Directing attention to FIG. 2, an example layout illustrates several exemplary options enabling the creation of tiles using the GUI 43 of the PinBit system. These options include, but are not limited to:

dragging and dropping a hyperlinked element from a web browser to a wall (a displayed collection of tiles) on the PinBit GUI 43, this action 210 creates a tile displaying the element and linking it back to the web page;

dragging and dropping a file from the desktop to a wall on the PinBit GUI 43, this action 220 creates a Tile displaying the file content and attaching the file;

navigating to a web site, clicking "Post to PinBit" on the web browser, and choosing a web element to be posted to PinBit GUI 43, this action 230 creates a tile displaying the element and linking it back to the web page; and clicking "Add" in PinBit, choosing a tile type, and providing a path to the source content, this action 240 creates a tile with the content hyperlinked or attached (depending on the content).

Figure 3:
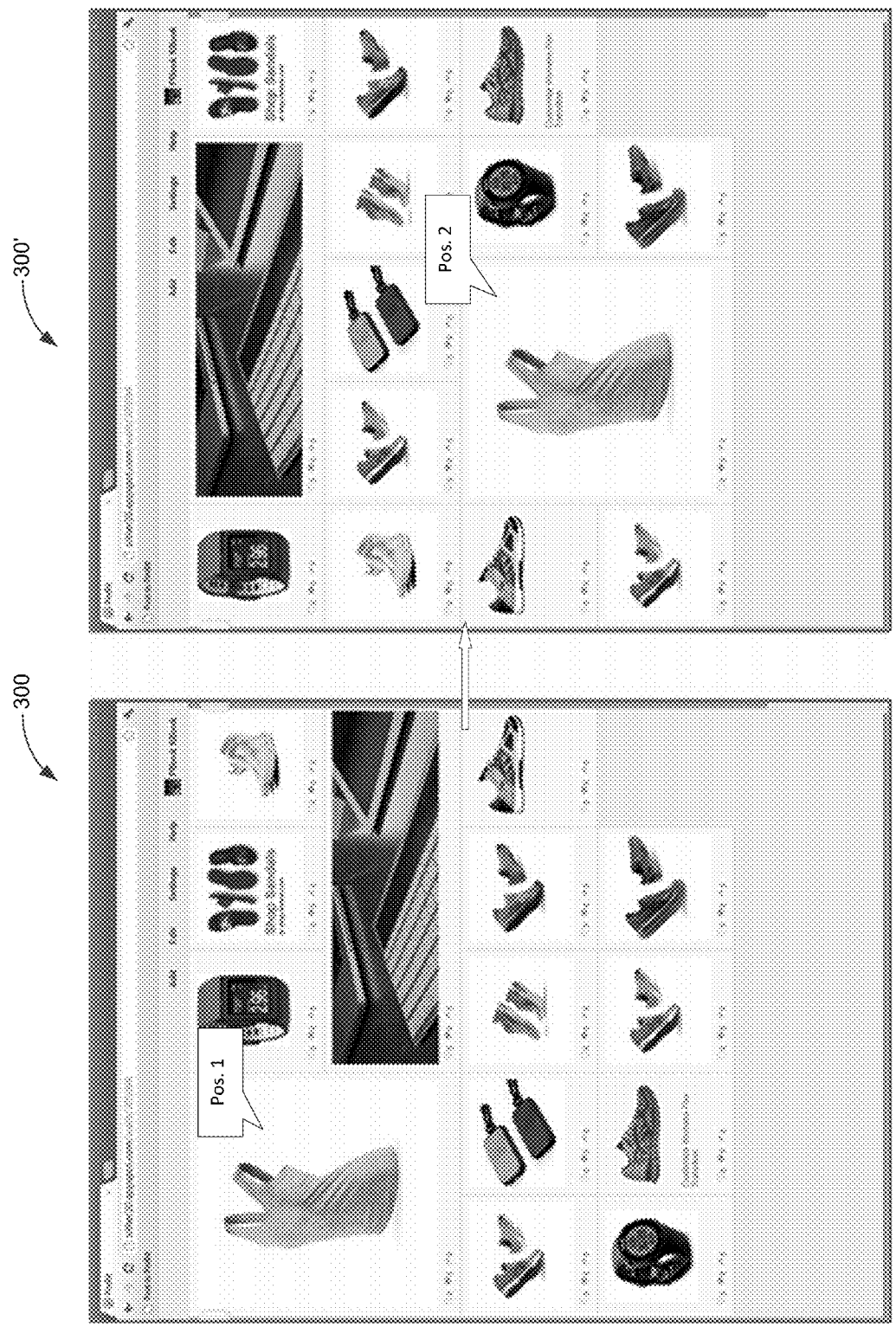
FIG. 3 shows an example of arranging tiles on a wall in accordance with one example embodiment disclosed herein.

Now referring to FIG. 3, the GUI 43 enables arranging tiles on an interactive wall in several ways. The user can move tiles by selecting one or more tiles, and dragging the tiles to a new location. After this action other tiles will automatically be rearranged to make space for new tile. In one embodiment several rules are used to control tile arrangement on a wall as follows:

rule 1: dragging a tile onto a group of tiles (collection of tiles that touch each other) will only rearrange tiles in that group (other groups can only be pushed aside as a whole);

rule 2: shift-dragging a tile in a group (collection of tiles that touch each other) moves all tiles in the group;

rule 3: shift-dragging a heading tile (a tile that is designated as a heading and that has limited features) will move the heading tile and all tiles underneath the heading tile (and above any other group or heading tile); and rule 4: double-clicking between two tiles will connect (or disconnect) the two tiles (the two tiles will maintain their relative positions when moved). FIG. 3 shows a tile on screen 300 being moved from position 1 to position 2. Note that after the move the tiles are automatically rearranged in screen 300'.

Figure 4:
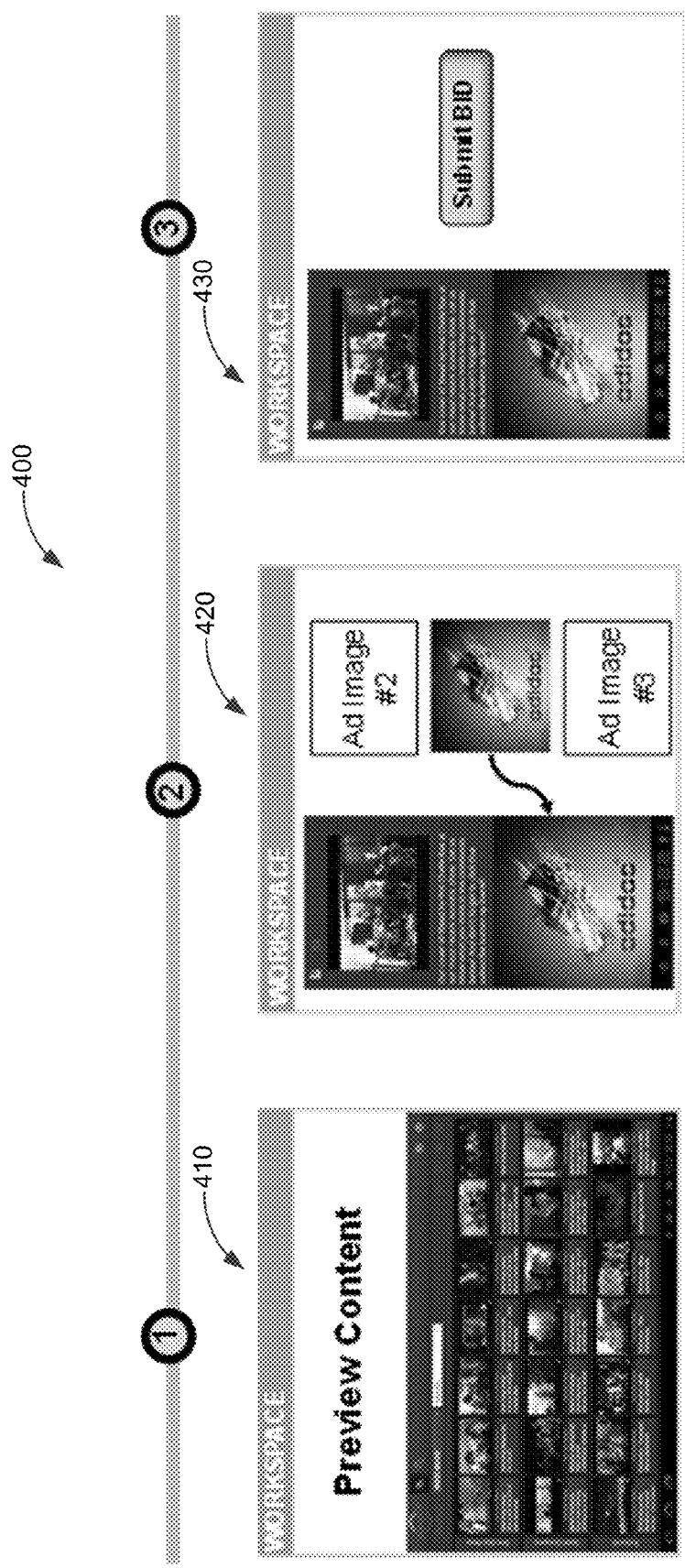
FIG. 4 shows an example of attaching an advertisement to a tile in accordance with one example embodiment disclosed herein.

Now referring to FIG. 4, the GUI 43 enables an advertiser to connect an advertisement to a tile with the following exemplary steps:

step 1: find a suitable advertisement and tile to connect.

step 2: upload and preview an advertisement and optionally choose from various display options.

step 3: enter and submit bid, for example, the advertiser can bid for advertising space on one particular tile and if successful the advertisement is associated with the particular tile.

Figure 5:
FIG. 5 illustrates how the graphical user interface (GUI) displays the multimedia content connected to tiles on the interactive wall and displays an advertisement when a tile is accessed in accordance with one example embodiment disclosed herein.

Now referring to FIG. 5, the GUI 43 displays the multimedia content connected to tiles on the interactive wall and displays an advertisement when a tile is accessed. Accessing a tile can be accomplished by, for example, clicking on a selected tile. For each tile selected, the right side-bar in the GUI displays additional tile data such as such a detailed description, an advertisement or a discussion thread. In one embodiment, the PinBit system provides direct connection between content and advertisement, for example, one specific advertisement is directly connected to one specific piece of content associated with a tile. The advertiser knows what content his advertisement is associated with and vice versa. The PinBit system links advertising revenue to the success of the associated content (new advertising model). The content and the advertisement are combined into a single unit associated with a tile that remains connected when shared (re-posted) between users. Advertising revenue is generated when consumers view, collect, share or discuss tile content associated with advertisements, as well as when users click on advertisements to be connected to a destination site (such as a web page or PinBit Showroom). Hence, the distribution of content by users becomes a benefit for content owners as it increases advertising revenue over a longer time periods (continuous) and without user accessing the content originating web sites.

In contrast to conventional techniques, the advertisement is not embedded or overlaid on the content (such as in-video ads). The content and the ad may appear in different locations on the display. The advertiser can search for popular tiles and bid on advertising space associated with individual tiles. The advertiser can create Walls (PinBit Showrooms) where products can be viewed, collected, shared and discussed like any other content. The advertiser can modify the advertisement while the associated content is traveling. The advertiser can send messages to the viewers of the content/advertisement. These features provide real-time connections to consumers, and advertising fees are dynamically priced and negotiated between advertiser and content owner via a stock market-like exchange. The connection between the advertisement and a tile can be a link or an attachment.

Figure 6:
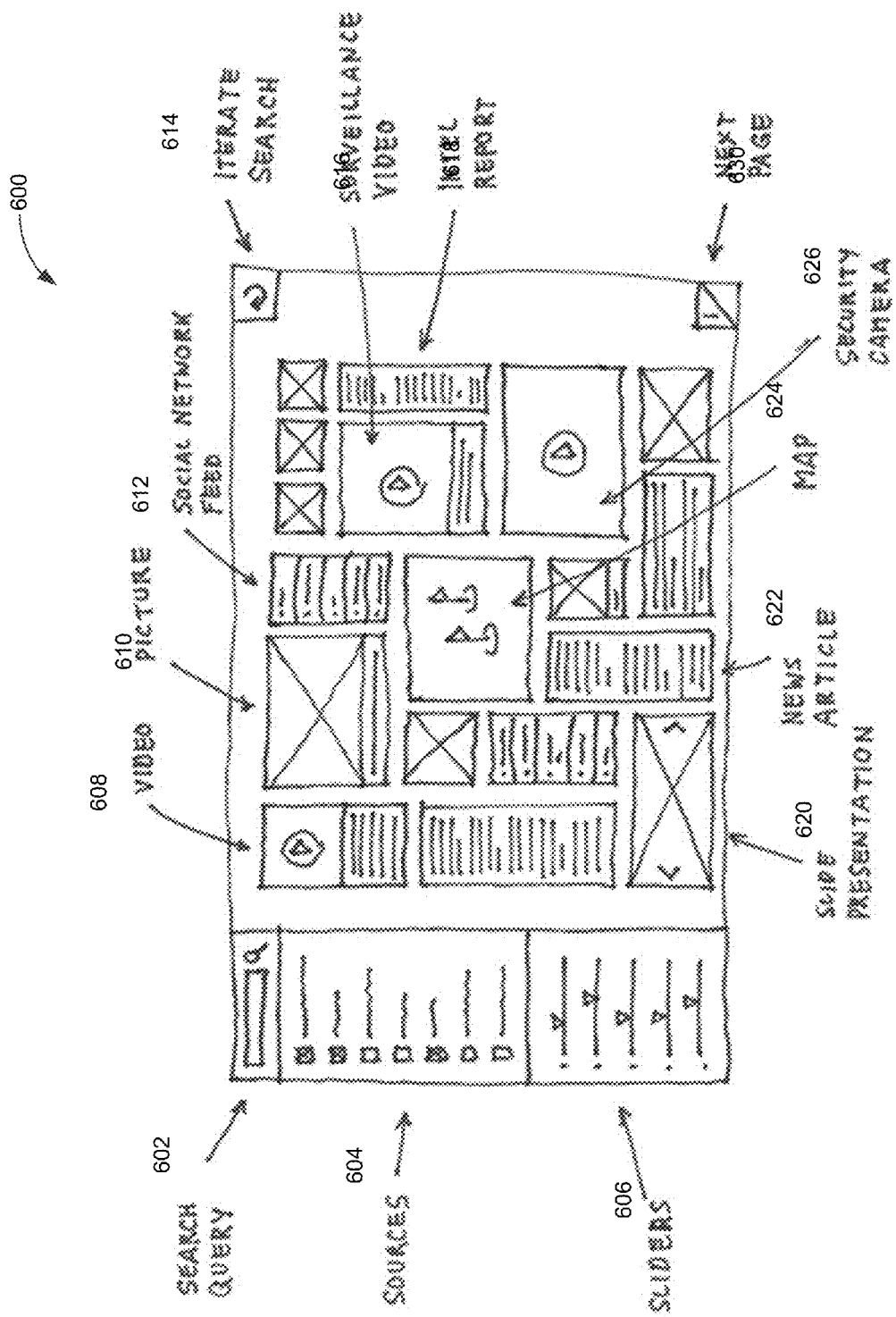
FIG. 6 illustrates how a PinBit Robot is configured using the GUI in accordance with one example embodiment disclosed herein.

Now referring to FIG. 6, the GUI 43 allows the selection of a PinBit Robot which automatically generates walls from third party content based on user preferences and search expressions. The robot populates the interactive wall in response to a user supplied search query and selection of a domain. In conjunction with the robot, new walls can be added on demand. A Wizard can pre-populate new walls with tiles based on user preferences, interests and activities. In one embodiment, robots help populate and layout Walls (automatically generated collages that can serve as templates or as final products). Users can enter one or more search queries and choose a domain (e.g. Music, News, Fashion, etc.). The Robot will then (1) select appropriate PinBit Filters to collect content, (2) collect content, (3) select content, (4) choose appropriate Tile sizes and picture-text proportions for content, and (5) layout the Tiles on a Wall. The user can then (1) select the portions of the Wall he likes (by selecting the Tiles he likes) and ask the Robot to redo everything else, (2) manually manipulate the Wall, or (3) leave as is. Robot generated Walls can be used (1) as templates, (2) as inspirations, or (3) as a means to causally search or browse multiple information sources simultaneously.

The Robot will then select appropriate PinBit Filters to: collect content; select content; choose appropriate Tile sizes and picture-text proportions for content; and layout the Tiles on a Wall.

In one embodiment, a control panel 600 for configuring the PinBit robot includes a Search Query window 602, a source selection panel 604, sliders 606, a video window 608, a picture window 610, social network feed windows 612, an iterate search button 614, a surveillance video window 616, and intelligence report text window 618, a slide presentation window 620, a new article window 622, a map window, a security camera window 626 and a page control button 630.

In operation, the search query window 602 enables the user to enter one or more search expressions used by the PinBit robot. The source selection panel 604 allows selection of specific internal and external information sources to be included in the search.

Sliders 606 provide adjust search parameters (e.g., focused vs explorative, user specific vs, popular, etc.). Search results are viewed in the various windows on the control panel 600. The search results are viewed as an interactive multimedia collage (containing live blogs, social networking, news, video and intelligence feeds, as well as pictures, text, diagrams, maps, slides, audio and video recordings). The user can iterate the search using iterate search button 614. The user can select the best results and iterate the search to retrieve more results that match the selection. A PinBit wall is use to collect, organize, discuss and exchange search results. In alternative embodiments, an artificial intelligence (AI) system is used to automatically select sources, adjust sliders or even enter search queries by inferring user preferences and task-foci from the observation of user activities.

Related to the PinBit robot is a PinBit Discoverer. The Discoverer automatically collects and displays content of potential relevance to the user. The PinBit Discoverer examines recent Tile activities (views, modifications, exchanges, etc.) on the Walls of a particular user, investigates if any of those Tiles are associated with sources that PinBit can query for relevant content, and retrieves and displays the relevant content (such as relevant information, relevant Walls, users with relevant expertise, and users with similar interests).

It is noted that the PinBit Discoverer can be complemented with EWall AI technology (as described in U.S. Pat. No. 7,640,511, entitled "METHODS AND APPARATUS FOR MANAGING AND INFERRING RELATIONSHIPS FROM INFORMATION," issued Dec. 29, 2009) and assigned to the same assignee as the present application. EWall AI technology autonomously and unobtrusively infers a user's tacit knowledge, domain expertise, interest and task focus by analyzing the spatial, temporal and collaborative use of information, autonomously maintains a transactive memory (database with knowledge about who knows what and who needs to know what), and autonomously provides individual users with relevant knowledge and expertise. In one embodiment, the PinBit Discoverer can automatically fine-tune the PinBit Robot actions and automatically execute timed searches (e.g., every 5 min).

Referring again to FIG. 6, the GUI 43 provides a filter using controls similar to those shown in FIG. 6 to display search results within at least one of the plurality of tiles in response to a user supplied search query and selection of a web site. PinBit Filters allow users to view third party web content (such as YouTube and Google News) and personal content from third party web services (such as Evernote and Dropbox) in Tile format.

PinBit offers Filters that allow for searching (enter search query) and browsing (choose category) of third party web sites (such as YouTube and Google News) and services (such as Evernote and Dropbox) from within the PinBit environment, and that display search results in Tile format.

Search options, post-search options and categories are Filter specific and reflect the search options, post-search options and categories on the respective third party resource (website or database). Filters can easily be added and removed from the PinBit interface. An API allows for the very quick development and insertion of additional Filters to access other public or private information resources. One benefit of Filters is that users can access content from different resources in a standardized format and from within the PinBit environment, and that content can instantly be transferred and integrated into personal Walls. It eliminates the need for people to access multiple different web sites which often present and organize content in different ways and which do not provide the means to copy and combine content.

The filter displays search results within a tile in response to a user supplied search query and selection of a web site. There are different types of Tiles for different types of information such as a Feed tile that dynamically displays the most recent contents of an RSS feeds from sources such as Twitter, Facebook or CNN.

Tiles are similar in look, feel and functionality. Certain Tile Types have unique features that help distinguish and operate specific Tile contents. Tile types include, but are not limited to:

Video Tile: Video plays directly inside the Tile yet can also be viewed and annotated (modify start-stop position, add callouts) in full-screen mode.

Music/Audio Tile: Contains the audio (e.g. song) and displays a picture (e.g. album cover art). Allows users to play and annotate (modify start-stop position) the audio file.

Picture Tile: Picture is displayed on the Tile yet can also be viewed and annotated (add callouts, modify picture pan and zoom, draw on picture) in full-screen mode.

Feed Tile (dynamically updated): Feeds such as RSS feeds, Tweets and Facebook posts can be displayed in Tiles. There are various visualization options for Feed Tiles: (1) Feed Tile displays feeds as a vertical scrollable list; (2) Feed Tile displays one feed item and left-right arrows allow the user to explore additional feed items; (3) Feed Tile displays one feed item where the Wall creator specifies which feed item (e.g. the most recent feed item, or the third most recent feed item).

Heading Tile: A Tile that only acts as a heading and does not have any special capabilities such as functions, indicators and sharing.

Slide Show Tile: Automatically rotates the contents in the multimedia and text area. Also allows users to manually rotate the contents.

Web Snippet Tile (dynamically updated): Allows users to display a specific portion of a webpage inside a Tile.

Assessment Tile: Primarily for education where the front of the Tile contains a test question and the back of the Tile the answer.

Function Tile (Search, Filter, etc.): Allows users to create Tiles that contain a search text box (to highlight Tiles that match a particular search expression, or to hide tiles that don't match a search expression, or to jump to a different Wall that automatically assembles matching Tiles) or filtering options (e.g. to show only Tiles with Videos and Music).

Figure 7:
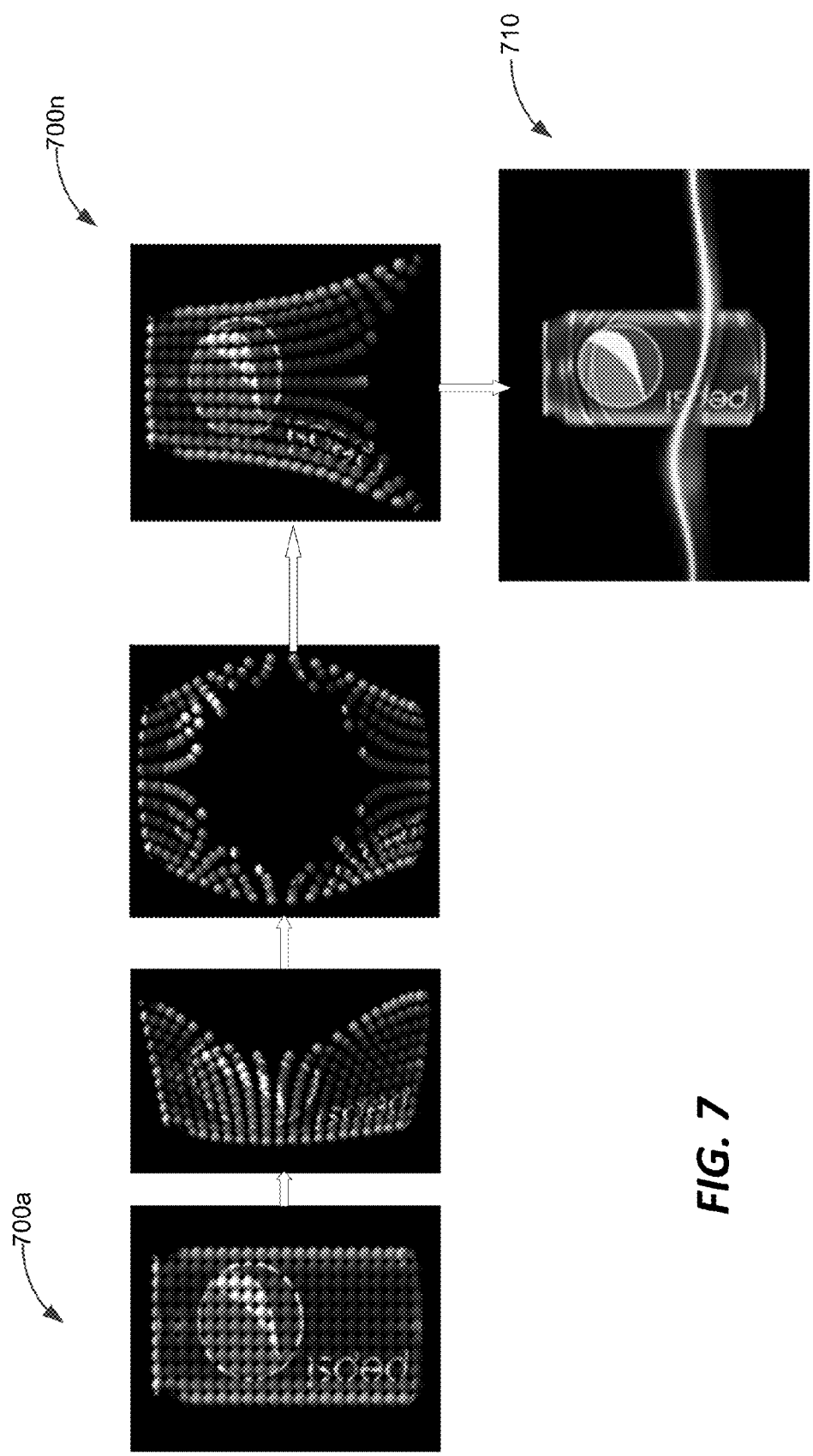
FIG. 7 illustrates several screens of an exemplary advertisement synchronized to music content.

Now referring to FIG. 7 several screens 700*a*-700*n* and 710 of an exemplary advertisement synchronized to music content are shown. Embodiments disclosed herein provide techniques for monetizing an advertisement connected to a tile and enhancing interest in the advertisement by synchronizing real time visual effects with at least one audio component of the multimedia content. In embodiments of the PinBit system 100, music synchronized advertisements can adapt to the beat of a song, mix or remix if the Tile content contains audio (such as music, audio books, sounds, or videos) Music synchronized advertisements types can include:

Particle animations

Light animations

Morphing 3D graphics (e.g. avatars)

Social feeds (such as Facebook and Twitter)

Advertisements become integral part of the entertainment (music, video) consumption experience. An advertisement connected with a particular piece of music can become the song's music video, and the song can become the advertisement's soundtrack.

Users benefit from the (synchronized and animated) advertisements by having music complemented with matching visual effects rather than being interrupted by static or non-matching advertisements that present themselves before, during or after the consumption of content.

Advertisers can create new forms of digital advertising by automatically synchronizing advertising content with music. Pairing an advertisement with different audio components (e.g., music) results in a digital advertisement that looks different for each pairing. This capability enables advertisers to display unlimited numbers of unique advertisements, with a single piece of advertising content, and enables every advertisement to have a fresh, unique appearance that is more likely to resonate with consumers. The music synchronized advertising creates a more compelling and lasting impression with advertisement viewers. Advertisements appear to be continually unique, even though the advertisement content is the same.

The artistic flair of advertisements combined with consumer-selected music increases the likelihood that consumers will view the advertisements as well as share and exchange the advertisement enriched content with their friends, resulting in significantly more advertisement-views/revenue. Reduced advertising creation costs (advertising campaigns can be created from as a little as a static advertisement image). Mass-customized advertising (the advertisement looks different for every piece of content it is merged with). Reduced Piracy (users are less likely to detach advertisements from the content).

Figure 8:
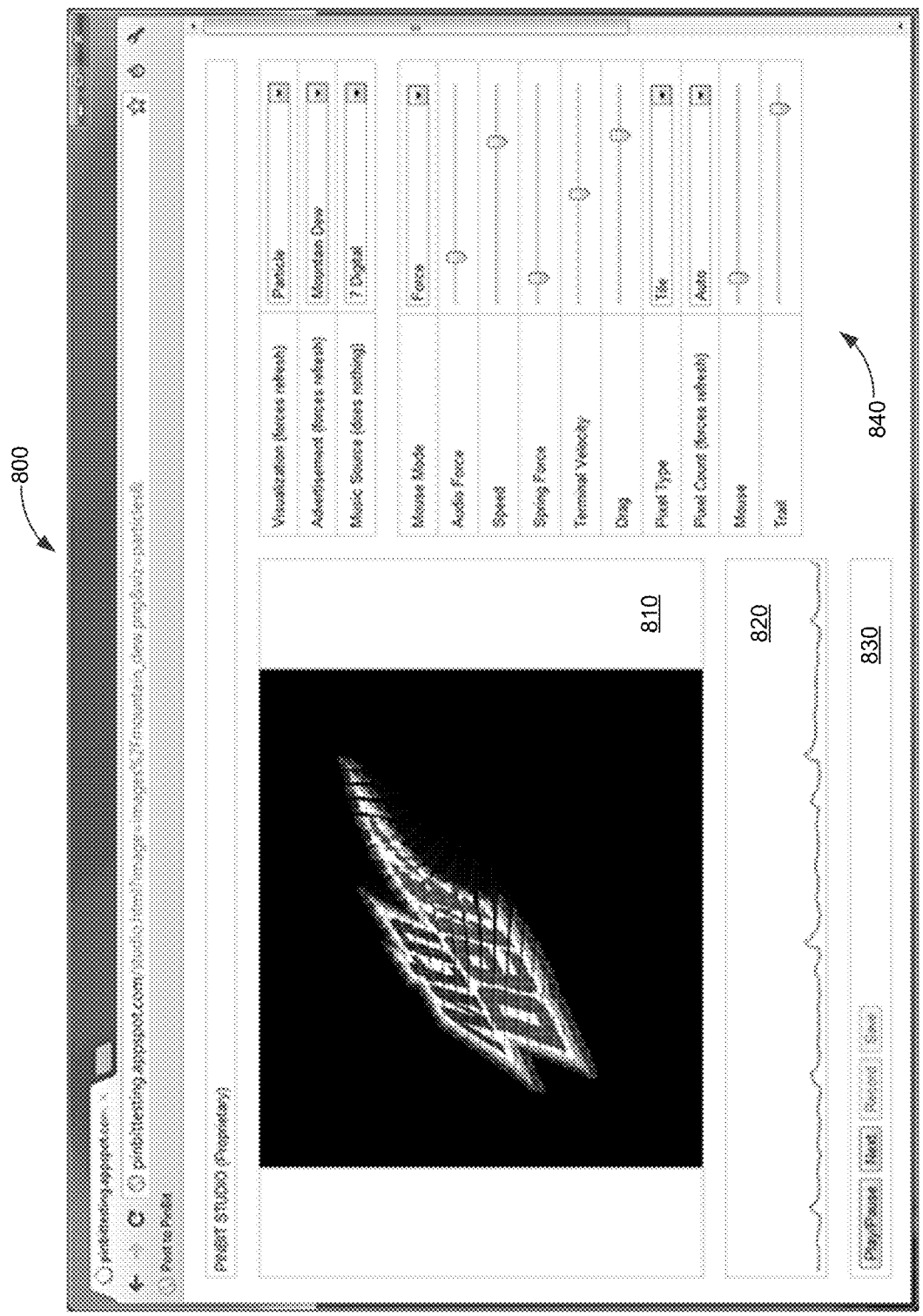
FIG. 8 is a screen shot of controls which enable users to manually adjust music synchronized advertisements in accordance with one example embodiment disclosed herein.

Now referring to FIG. 8, the GUI 43 enables users to manually adjust music synchronized advertisements. Music synchronized advertisements can be interactive (gamified) allowing users (professional advertisers and consumers) to manually adjust music synchronized advertisements and share them with other users (that can view, comment, like and rate the adjustments). The GUI 43 provides a display screen 810, a waveform display 820, recording controls 830 and several animation controls 840 including:

Visualization (Particle, Light, etc.);

Advertisement (Picture);

Music Source (for developers only);

Mouse Mode (interact with animation, change animation parameters, etc.);

Audio Force (how intensively the music affects the animation);

Speed (how fast the animation changes);

Terminal Velocity;

Drag (how quickly the animation recovers if all forces disappear); and

Pixel Type (square, round, etc.).

Now referring to FIG. 9A, a block diagram 900 illustrates the PinBit Ad-Sync Architecture. The PinBit Ad Sync process is an automated system that triggers effects in a visual environment in response to events in music (e.g. beats, bars, and section transitions). The system is described in terms of two sub-systems, a Beat Detector 920 and a Visual Environment 930 in which effects can be triggered. Boxes 940 and 942 show two types of visual environments, a Rhythmic Image 940 is a display of rhythmic visual effects such as lighting changes, pulses, waves, and flashing colors on top of one or more mages and a Rhythmic Scene 942 is a multimedia display of one or more avatars in a virtual scene. Avatars autonomously move to the beat of the music and may also interact with each other and objects in the scene.

Now referring to FIG. 9B a block diagram 950 illustrates the Ad-Sync Event Detector Process. The Beat detector 920 (also referred to as an Event Detector 920) accepts as input a song 952. The detector first analyzes the song 952. The Event Detector 960 determines whether to use a track analysis API 962 depending on whether the track is pre-analyzed (e.g. by ad-synch or a third party service) or live-analyzed. A track analysis 966 or a detection algorithm 964 determines whether a new event is detected 968. New events are sent to the Visual Environment 930. The result the detection or analysis is a data structure that lists beats, bars, and sections, collectively called "Events." A single event is defined as having a start time, a duration, and a confidence factor. While a song plays, the detector polls the music player for the current time and queries the track analysis for the next event (the earliest event occurring after the current time). If the next event is the same as the previous event (in other words, the player hasn't passed the last detected event yet), then the detector does nothing. If the next event is new, then the detector triggers an effect in a visual environment 930.

The Visual Environment 930 includes three parts: (1) A visual representation; (2) A set of effects that can be triggered; (3) A user interface for creating and configuring the environment. There are two primary types of visual environment, the Rhythmic Image 940 and the Rhythmic Scene 942.

A Rhythmic Image 940 displays one or more images and overlays various visualization effects. Effects include lighting changes, pulsing, spotlighting, waves, ripples, and flashing colors. Some effects can be more pronounced for musical events with higher confidence factors. The user configures a Rhythmic Image by (1) uploading one or more images; (2) specifying whether the image(s) should be centered or tiled; (3) selecting which effect(s) to enable.

The Rhythmic Scene 942 displays a virtual environment filled with autonomous avatars and objects. The avatars can interact with each other and with objects, and they move in sync with the music. When an effect is triggered, something suddenly changes in the scene. For example, an avatar may suddenly jump, an object might break into two, or a new avatar may run into the scene. Additionally, the scene supports branding; objects, walls, and avatar clothing are capable of displaying images, such as brand logos. Objects may also be specific products being advertised, such as a Pepsi® can, a Gibson® guitar, or a Ford® truck. A scene creator can choose from one of three complexity options: "Single Avatar", "Multiple Avatars", and "Rhythmic Storyboard".

Single Avatar: The simplest scene is composed of a Single Avatar. The user first chooses an avatar by either selecting one from a library or uploading a custom avatar. Next, the user uploads one or more images to display on the avatar's clothing and/or in the background of the scene. The user also configures the avatar's rhythmic activity by selecting from options that include walking, jumping jacks, jump-roping, and dancing. Examples include:

Example 1: A jump-roping lizard wearing a Geico® shirt

Example 2: Hertz's Horatio character wearing a Hertz® shirt and dancing

Example 3: Snoopy wearing a MetLife® shirt and walking on a beach

Example 4: Dancing Mr. Peanut®.

An advertiser can choose from a collection of PinBit-created or licensed avatars or they can create their own avatar. Advertisers can also specify a static advertisement to display on an avatar's clothing. For example, if the advertiser is the Geico Insurance Company, their avatar can be a lizard wearing a Geico® T-shirt, while tapping on his foot and bobbing his head on every other beat.

Multiple Avatars:

A more complex scene can contain multiple avatars and objects, which are all capable of interacting. Independent of the music, avatars and objects are free to wander, drift, and interact autonomously, but like in the single-avatar scene, each avatar (or object) can have special actions that it performs when a musical event is detected. When an event is detected, the system chooses one or more objects and avatars and performs one or more of these special actions. For example, a balloon might pop, an avatar might skip, and a new avatar might walk onto the scene. The user configures a multiple-avatar scene by choosing multiple avatars, multiple objects, and a scene setting (e.g. park, lake, mountain top, etc.) from a library of avatars, objects, and settings, respectively. The user can customize the scene by placing objects and avatars and by tweaking their physical properties (color, size, weight, center of gravity, etc.) and behavioral properties.

For example, a balloon vendor and a street performer are shown in a park. On every bar, a balloon floats away or pops. The street performer dances to the music. On section transitions, an avatar walks in and buys a balloon. During the bridge, a group of people run onto the scene and do a flash mob. The balloon vendor is drinking a can of Pepsi®, and the people in the flash mob are wearing Pepsi shirts.

A Rhythmic Storyboard connects multiple scenes together, transitioning between them when the song experiences major events (like a transition from verse to chorus). Each scene in a storyboard can be tagged according to what audience(s) it appeals to and what emotion(s) it evokes. The system considers these tags when choosing which scene to transition to. For example, if the upcoming chorus is intense and the song is from the rock genre, the system may choose a scene tagged with emotions like "excitement" or even "anger". But if the chorus is calm and the song is from the reggae genre, the system may choose a scene tagged with emotions like "contentment". The user configures a rhythmic storyboard by assembling a collection of multiple-avatar scenes into a workspace and tagging each scene according to the target audience and emotion. In this workspace, the user must also draw connections between scenes to indicate to the system which scenes can transition to which scenes. The result is a scene graph that plays out a slightly different scene sequence (a different story) for every song and user.

An exemplary scenario shows a content owner can encode parts of their content with markers, which can be filled in by an advertiser immediately before the advertisement is scheduled to run. This capability turns the content itself into a stream of advertisements.

Example 1

A cartoon regularly has a scene where someone is eating cereal. An animator can encode the branding on the cereal box so that it can be bought and filled in by a cereal brand, such as Frosted Flakes or Raisin Bran. Companies bid to inject their branding into the cartoon by putting their brand on the cereal box.

In another example, a TV broadcasts (live and pre-recorded) can replace signs, posters, etc. with green screens, which can be bid on by advertisers. A syndicated TV show, they might feature Coke branding in the original broadcast but Pepsi branding in the syndicated broadcasts.

Figure 10:
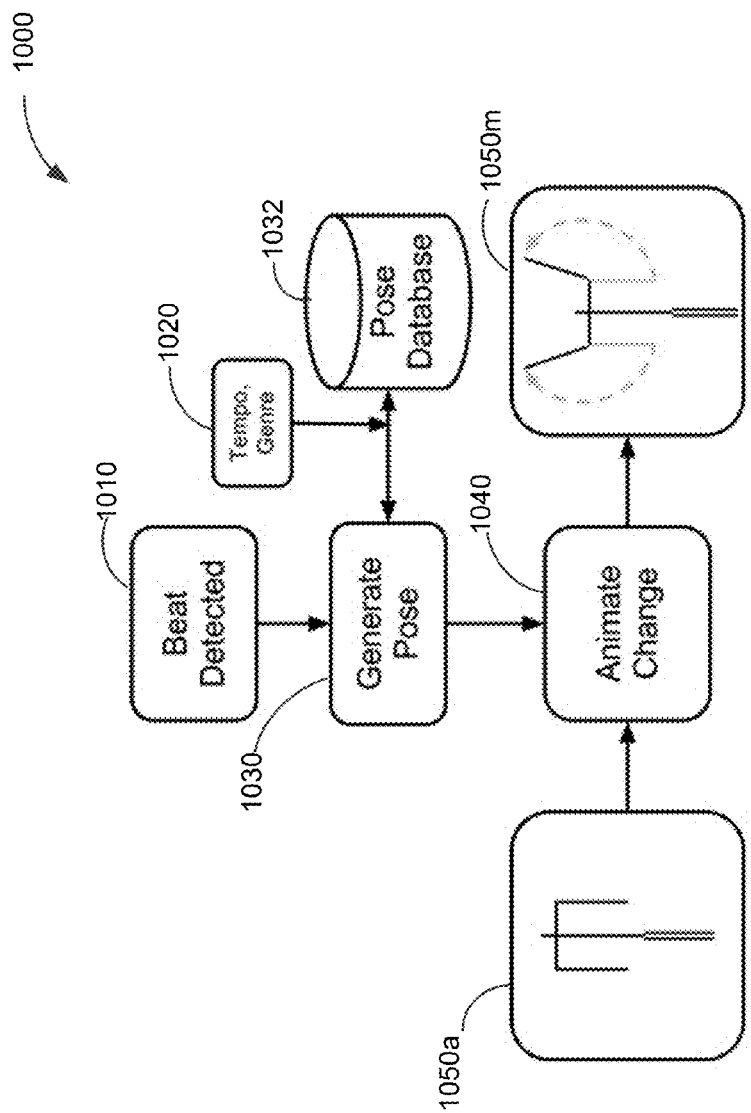
FIG. 10 is a block diagram 1000 of the Ad-Sync Choreography process of FIG. 9A.

Now referring to FIG. 10, a block diagram 1000 details the Ad-Sync Choreography process. In operation the Ad-Sync Choreography process provides an automated dance feature. Any avatar in a rhythmic scene can be configured to dance autonomously. Dancing avatars are powered by an intelligent choreography algorithm that dynamically generates sequences of dance moves using a motion capture database, correlations between music genres and dance styles, and a degree of randomness. The system contains a database 1032 (which could be combined with database 125) that is preloaded with motion capture data representing poses and movements from common dance styles. Each entry in the database 1032 is tagged with information indicating what type of music (genre, tempo, 1020) the dance is best paired with. The choreography algorithm uses information about the currently playing song to derive a set of good matches in the database. Then from this set, the system assembles a semi-random sequence of dance moves 1030 and uses them to dictate how to move 1040 the avatar 1050*a*-1050*m* in response to musical events detected by the beat detector 1010.

PinBit's Ad-Sync process can choose an optimal advertisement targeted to a given user, based on that user's profile and recent activity. PinBit's Ad-Sync Technology can also tweak the presentation of that advertisement for that user. PinBit's Ad-Sync process can extract essential elements out of the original advertisement, such as avatars and branding, and reconstruct the scene to show the avatars participating in an activity that the user is interested in. This process enables advertisers to encapsulate only the essential elements of an advertisement (the characters, the branding, and perhaps specific products) and leave the rest up to PinBit's Ad-Sync Technology. With the effort of creating just a single advertisement, advertisers can create an entire campaign that automatically adapts itself to target different audiences.

For example, an original advertisement shows two avatars wearing Nike shirts and having a picnic in a park, but the engine detects that the user is interested in Frisbee. The Ad-Sync process would display the two avatars getting up from their picnic and start throwing a Frisbee back and forth. Or if the user is interested in biking, the two avatars would grab a couple bikes and start riding through the park.

Figure 11:
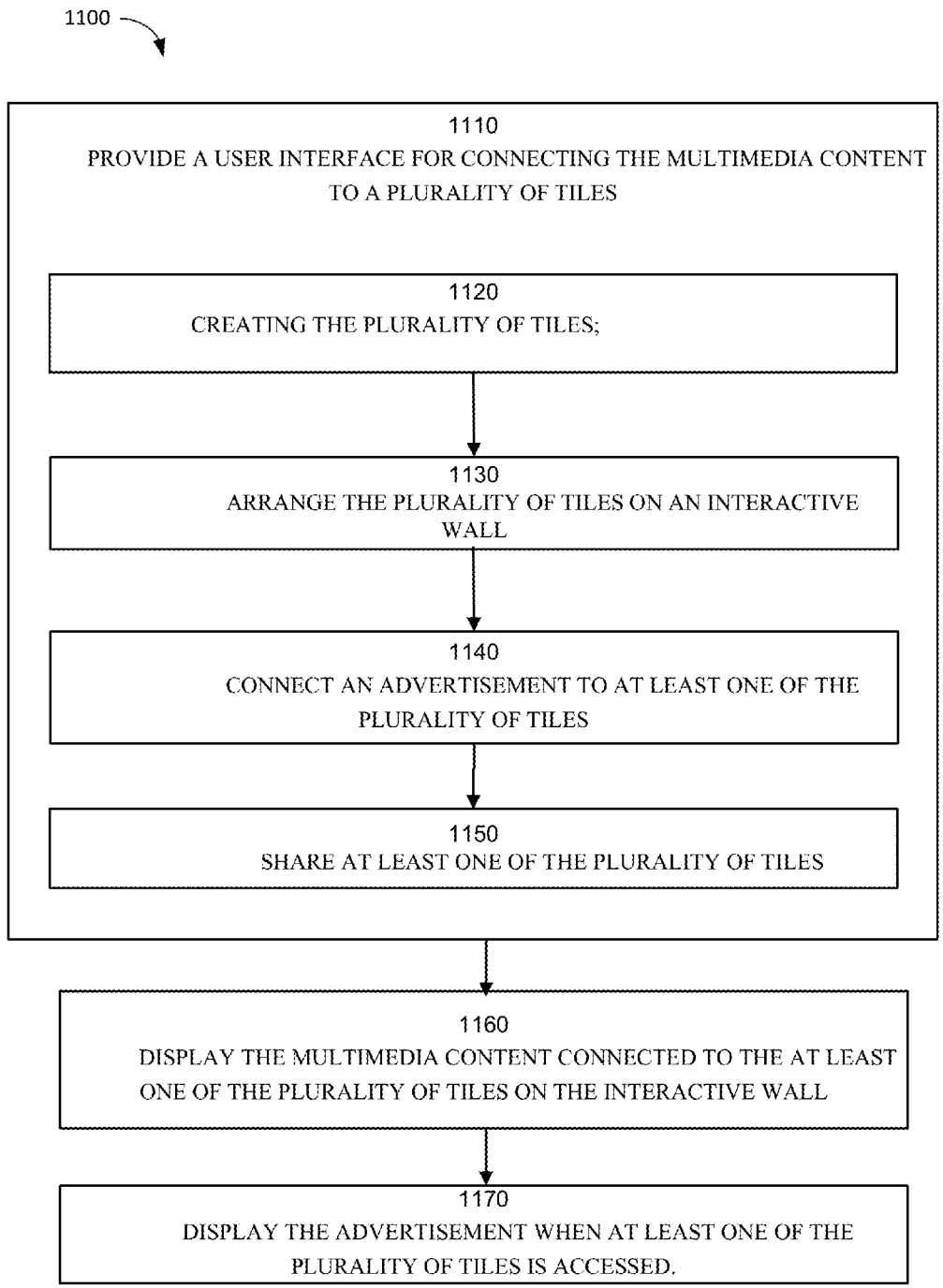
FIG. 11 is a flow chart of processing steps performed to present and share multimedia content the in accordance with embodiments disclosed herein.
Figure 12:
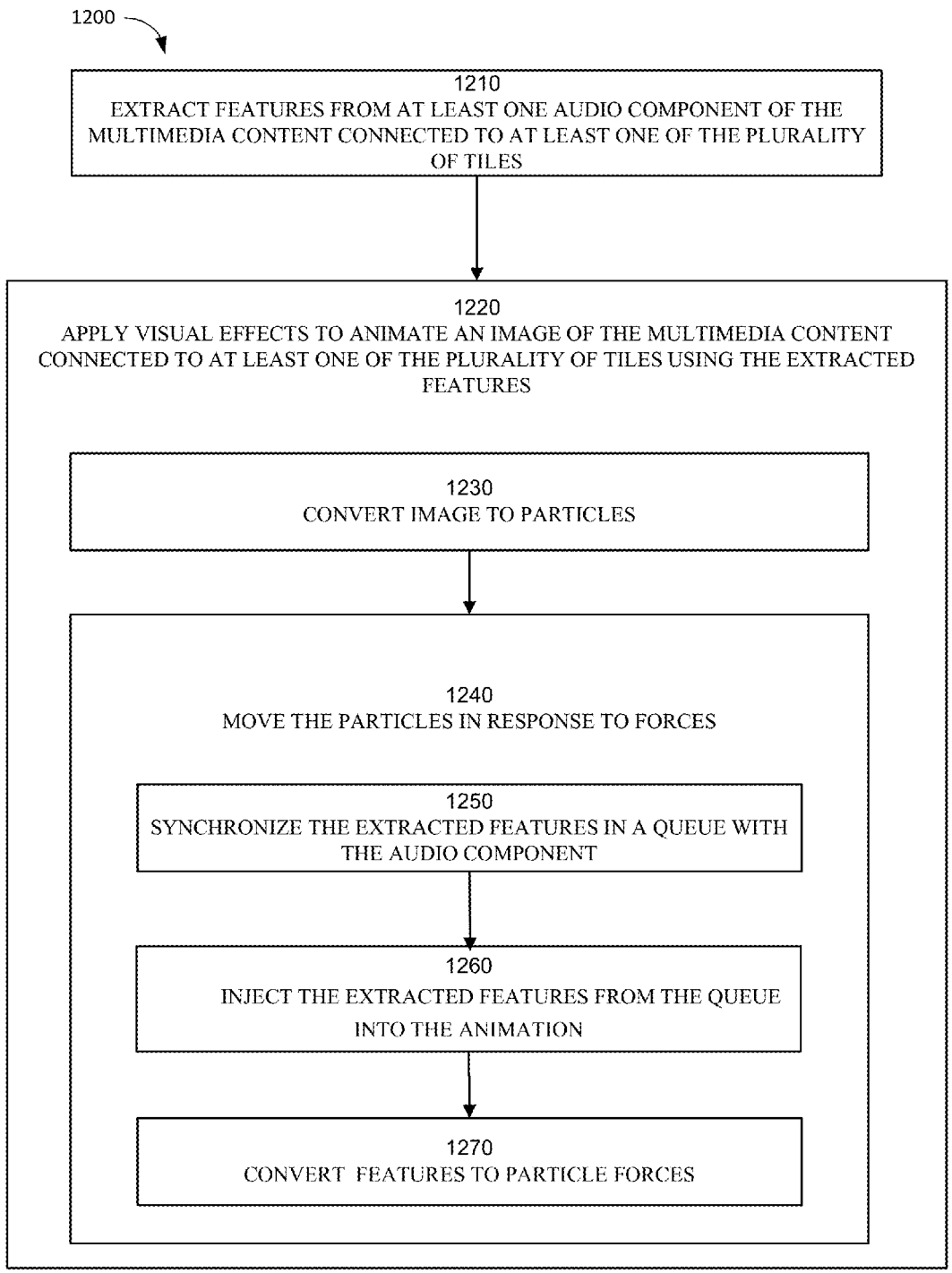

Functionality supported by computer system 110 and, more particularly, functionality associated with PinBit system will now be discussed via flowcharts in FIGS. 11-13. For purposes of the following discussion, flow diagrams of particular embodiments of the presently disclosed methods are depicted in FIGS. 11-13. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIG. 11, a method 1100 for presenting and sharing multimedia content is shown. Method 1100 begins with processing block 1110 which discloses providing a user interface for connecting the multimedia content to a plurality of tiles. At step 1120, the user interface enables creating the plurality of tiles. Several options for creating the tiles as described above in conjunction with FIG. 2. At step 1130, the user interface enables arranging the plurality of tiles on an interactive wall as described above in conjunction with FIG. 3. At step 1140, the user interface enables connecting an advertisement to at least one of the plurality of tiles as described above in conjunction with FIG. 4. At step 1150, the user interface enables sharing at least one of the plurality of tiles.

At step 1160, the system displays the multimedia content connected to the at least one of the plurality of tiles on the interactive wall. Finally, at step 1170, the system displays the advertisement when at least one of the plurality of tiles is accessed.

Now referring to FIGS. 12-13, enhancements to the process of displaying advertisements is shown in flowcharts 1200 and 1300. At step 1210, features are extracted from at least one audio component of the multimedia content connected to at least one of the plurality of tiles. The audio component includes, but is not limited to a beat of a song, a beat of a mix, a beat of a remix, an audio book and a sound from a video. At step 1220, visual effects are applied to animate an image of the multimedia content connected to at least one of the plurality of tiles using the extracted features. The visual effects include, but are not limited to a particle animation light animations and morphing avatars.

At step 1230, the image is converted to "particles." At step 1240, the particles are moved in response to "forces" in steps 1250, 1260 AND 1270. At step 1250, the extracted features in a queue are synchronized with the audio component. At step 1260, the extracted features from the queue are injected into the animation. At step 1270, features are converted to particle forces.

Steps 1310, 1320 and 1330 in conjunction with the following description detail several ways that features can be extracted. At step 1310, the audio stream is processed as it plays and the features are extracted in real time. At step 1320, a feature list is compiled ahead of time by allowing a user to listens to the audio component and providing a graphical user interface (GUI) for enabling the user to mark features, the audio component is pre-analyzed at step 1330. Further details of the steps in flowcharts 1200 and 1300 are described below.

In one embodiment, to animate a static image, the visual effects analysis application 140-1 breaks the image up into smaller parts referred to as "particles," and these particles can be moved independently from one another in ways that seem natural to the user because they mimic the motion of objects in nature. In one embodiment, this process requires two steps: Conversion of the image to particles, and moving the particles in response to forces.

Image-to-Particle Conversion

Given an image of width w and height h and rough number of particles P (rough means the result will be close to the desired number of particles but is not always precise, depending on the image's size), the application 140-1 computes the size (width and height) S of each particle as follows:

$$S = \text{ceiling}(\text{sqrt}(w*h/P))$$

So for example, given a 200×800 image and 100 particles, each particle is 40×40, and the resulting image is 5 particles wide and 20 particles high, yielding 100 particles exactly. As another example, a 300×400 image with 100 particles yields a particle size of 35, and the resulting image is 9 particles wide and 12 particles high, yielding 108 particles. Once the application has calculated the size of each particle, it creates the particles, each of which is a S×S subsection of the image, starting at 0,0 and expanding out in the x-direction (from 0 to w−S) and y-direction (from 0 to h−S). Each particle can then be transformed into a variety of different representations. Some examples include:

- Original (No transform). The particle displays an exact copy of the subsection.
- Dot. The application 140-1 averages the red green blue alpha (RGBA) values of all $S^2$ pixels in the subsection, and the application 140-1 displays a circle filled with the averaged RGBA value.
- Tile. The application 140-1 averages the RGBA values, and the application 140-1 displays a square filled with the averaged RGBA value and add a beveled effect around the edge.
- Morph. The application 140-1 computes several intermediate representations between Original and Dot, which allows us to slightly and progressively alter the representation in real-time in response to real-time inputs such as user interaction and beat detection.

The result is a set of particles that display some form of the original image when they are in their original, or equilibrium, positions, and each particle can be independently moved by the Particle System.

To make the particles move in a natural way, the application 140-1 constrains their movement with physics-based rules. Each particle keeps track of its current position and velocity, and every iteration of the particle system involves two steps: (1) Apply forces to each particle; each force applied adds to the particle's force vector; (2) Update a particle's position by adding its velocity multiplied by the time step ($x_{t+1}=x_t+v_t*dt$), and update its velocity by adding the force vector multiplied by the time step ($v_{t+1}=v_t+(f_1+f_2+\ldots+f_n)*dt$). At the beginning of the subsequent iteration, the application 140-1 clears the force vector on each particle and re-computes new forces using one of three options:

- Audio-Driven—A force that pushes all particles away from a given point. Magnitude of the force for a given particle is inversely proportional to the distance between the point and particle. The formula resembles the gravitational force formula: $F=K/D^2$, where K is a value derived from a combination of the loudness and the score of confidence level for the current beat, and D is the distance between the force origin and the particle.
- Equilibrium—A spring force that pulls particles back to their original positions. Each particle represents a subsection of the original image and thus has a "home" or "resting" position. To bring a particle back toward its home position, the application 140-1 attaches a permanent spring force whose direction points from the particle's current position to its home position, and whose magnitude is proportional to the distance from the current position to the home position.
- User-Driven—A repulsive point force that pushes all particles away from the mouse pointer. This allows the user to drag the mouse over the particles to force them apart.

Beat Effects

In order to induce particle movement that seems to correspond to the music, the application 140-1 extracts features from the music and maps those features to particle movements at the same time that the user perceives the features. Features include rhythm (beats and bars), changes in pitch (usually perceived as the melody), and changes in loudness. Using these features to induce corresponding effects in the particles involves two steps: (1) Feature extraction and (2) Feature synchronization.

Feature Extraction

The application 140-1 has three ways to extract features. (1) Live extraction—process the audio stream as it plays and extract features in real time. (2) Manual pre-extraction—compile a feature list ahead of time by allowing a user listens to a song while simultaneously interacting with a user interface to mark features when they hear them. (3) Automated pre-extraction—use an audio analysis program to compile a feature list ahead of time.

Live Extraction

The format and availability of an audio stream depends on the API. When audio data is available, samples are typically provided at set intervals in the form of an array of bytes, each representing the FFT magnitude of a different frequency bin. For example, the first byte often represents the magnitude of the lowest frequencies, while the last byte represents the magnitude of the highest frequencies.

Pitch can be extracted by finding magnitude spikes across a single sample. And by keeping track of where these spikes occur, the application 140-1 can extract melody by analyzing how the pitch changes. For example, if frequency f10 contained a spike at time t0 and frequency f11 contained a spike at time t1, then the application assumes the local pitch is increasing. The term "local" is used because other frequencies may be changing simultaneously and in a different direction; a melody is usually composed of multiple pitches moving somewhat independently).

For rhythm extraction the application 140-1 searches for patterns in inter-peak intervals in the lower frequencies. A peak is detected for a given frequency at time $t_n$ if the magnitude at $t_n$ is greater than the magnitude at $t_{n-1}$ and at $t_{n+1}$. Furthermore, the application 140-1 computes a weight for the peak by dividing the magnitude at $t_n$ by the magnitudes at $t_{n-1}$ and $t_{n+1}$. This helps to diminish the influence of slight rises that likely have nothing to do with the rhythm. The next step is to detect not only peaks but inter-peak intervals—the amount of time between two peaks. The application 140-1 uses cluster-based machine learning to do this. At the start of a song, the application 140-1 creates several clusters, each representing a separate hypothesis about the song's true inter-beat interval. Cluster hypotheses are initially evenly spaced across the range of acceptable rhythms (anywhere from 30 beats per minute to 180 beats per minute). When a peak is detected, the application 140-1 computes all inter-peak intervals between this peak and all other peaks detected in the last 2 seconds. Each interval is weighted by multiplying the weights of the two peaks, and then the application 140-1 throws out the bottom 75% of the intervals. Each of the remaining intervals is merged with the cluster whose hypothesis is closest. The merge process involves two steps: (1) Update the cluster hypothesis by computing the weighted average of the detected interval and the existing cluster hypothesis; (2) Change the cluster score to the weighted average of the current cluster score and the interval's score. As the song progresses, the clusters constantly update and usually two or three clusters clearly stand out with significantly high weights, indicating that one of them likely represents the human interpretation of rhythm. Clusters also keep track of when new intervals are added, so each cluster can provide a prediction about when it believes the next beat will occur; the application 140-1 makes this prediction by taking the time of the last observed interval and adding the hypothesis to it. Finally, the application 140-1 uses the prediction of the highest ranked cluster to predict when to expect the next beat.

Manual Pre-Extraction

To compile a feature list that is aligns with human perception, the application 140-1 provides a user interface that allows a user to compile the list manually. This interface allows the user to listen to a song while simultaneously pushing buttons to denote heard features. The most essential feature here is the "bar", or more accurately the first beat of a bar. Whenever the user hears this beat, also called "beat 1", they push a button, and the software records the time, accounting for a user delay of 200 ms. At the end of the song, the software inserts three evenly spaced beats between each bar (the application 140-1 assumes four beats per bar), which yields our beat list for the entire song.

This user interface is not limited only to beats. The application 140-1 can also provide controls allowing the user to indicate other changes, such as transitions from verse to chorus, gradual crescendos, solos, and more.

Automated Pre-Extraction

Offline (as opposed to live) techniques are far more reliable at extracting features like rhythm because they can analyze the audio data that comes both before and after a potential feature. The application 140-1 uses such techniques to compile feature lists whenever there is time and data available to pre-analyze a song.

Feature Synchronization

Each pre-extracted feature contains a timestamp. The goal of feature synchronization is to make sure that a feature's corresponding animation effect is initiated when the song's position reaches that timestamp (when the feature is being heard by the user). To do this, the application 140-1 maintains a queue of features ordered by timestamp. The application 140-1 constantly polls for the current position of the song and compares it to the timestamp of the first feature in the queue. If the current position is greater than 100 ms before the timestamp, then the application 140-1 initiates a delayed task (delayed by 100 ms) to inject the feature into the particle system. Then the application 140-1 removes the feature from the queue and performs the same check on the next feature, until the application 140-1 reaches a feature whose timestamp is later than 100 ms after the current position, at which time the application 140-1 goes back to polling. Synchronization of live-extracted features is more efficient. When a feature is live-extracted, the application 140-1 immediately injects it into the animation.

Figure 14:
FIG. 14 is a screen shot of the GUI 43, here shown on a tablet computer, enabling searching and bidding for advertising space in accordance with one example embodiment disclosed herein.

FIG. 14 illustrates the GUI 43 which enables Searching and bidding for advertising space. The Advertiser Application 148-1 enables an advertiser to continually view a list of bits (content) that content owners have sanctioned for advertising. Screen 1400 includes a bidding window 1410a-1410n. Advertisers use the bidding window 1410 to bid for advertising space associated with Tiles (via a process similar to eBay). The bidding window 1410 includes the number of bids, the time left to bid and a current price. Advertisers with the winning bids have their advertisement(s) embedded inside the pieces of content. When the Bit is complete it is (instantly or after a pre-specified delay or after minimum amount of add bid is reached) posted and also listed on the advertiser page to allow the bidding to start (meaning the posting may initially be advertising free). An advertiser may secure an advertising space for the bidding price for a limited amount of time. If during this time no higher bid is placed the advertiser keeps the space (or can opt out), meaning advertisers can continue to bid on spaces even after advertisements are being posted. Advertisers have the option to choose to share advertising space with other advertisers to lower the cost. The advertisement will be rotated according to the individual contributions by advertisers. The advertiser that is the highest bidder is awarded placement inside the piece of content. Advertisers can bid for placement in a piece of content for a specific period of time and/or a specific number of consumer views (i.e. the number of times a consumer has viewed the piece of content), or for a specific number of customer click troughs.

The PinBit System 100 provides several tile monetization options including but not limited to: Content providers can instantly generate revenue by enabling Tile monetization options. Tile Monetization Options include:

- Advertisements, Sponsorships: Users can allow advertisers to add advertisements to their tiles. Advertisements are not displayed inside Tiles but on the PinBit user interface whenever a tile is accessed. Users can restrict particular advertisement types or reject an advertisement after it has been submitted. Advertisement revenue is generated whenever a person views, copies, distributes or comments a Tile.
- Donations, Tips: Users can activate a "Donate" button that displays whenever a Tile is accessed.
- Direct Sales: Users can directly sell products displayed on Tiles by specifying a pricing and delivery options.
- Indirect Sales: Users can list a range of third party purchasing options (such as Amazon and eBay). Accessing a tile will display all purchasing options including pricing and purchasing location (e.g. URL).
- Revenue Sharing: Users can activate revenue sharing. This will automatically divide the money collected through various revenue options (such as advertising or donations) among all people that helped distribute the Tile. For example: User A owes a Tile that is connected to an advertisement. User B copies the Tile to his Wall. User C copies the Tile from User B's wall to his Wall. User D views the Tile on User C's Wall. User A receives 81%, User B 3% and User C 16% of the advertising revenue.
- Stocks: Users can allow other users to bid on the success of a Tile by investing money (become a Tile share holder). Revenue is proportionally distributed among all share holders. For example, User A opens a Tile for investment. User B buys 5% equity. 95% of all revenue goes to User A and 5% to User B. In other embodiments, monetizing the advertisement includes:
    displaying a donate button in response to user activation, the button displayed whenever at least one of the plurality of tiles is accessed;
    computing a shared revenue amount collected through revenue sharing option in response to user activation; and enabling direct sales of products displayed on at least one of the plurality of tiles in response to the user specifying pricing and delivery options.

While configurations of the system and method have been particularly shown and described with references to configurations thereof, it will be understood by those skilled in the art that various changes in form and details may be made therein without departing from the scope of the invention. As an example, the order of processing steps in the flow charts is not limited to the order shown herein. Accordingly, the present invention is not limited by the example configurations provided above.

What is claimed is:

1. A computer-implemented method of presenting and sharing multimedia content comprising:
    providing a user interface for connecting the multimedia content to a plurality of tiles, the interface enabling:
        creating the plurality of tiles;
        arranging the plurality of tiles on an interactive wall;
        allowing advertisers to add an advertisement to at least one of the plurality of tiles;
        connecting the advertisement to the at least one of the plurality of tiles;
        allowing a first user to exchange and share at least one of the plurality of tiles with a different second user;
    displaying the multimedia content connected to the at least one of the plurality of tiles on the interactive wall;
    wherein the display of each of the plurality of tiles includes at least one graphical icon to control functionality related to the at least one of the plurality of tiles;
    populating the interactive wall in response to a user supplied search query;
    discovering content by examining recent tile activity including the arrangement of the plurality of tiles on the interactive wall;
    accepting bids from advertisers for connecting an advertisement to at least one of the plurality of tiles;
    connecting the advertisement to the at least one of the plurality of tiles;
    exchanging and sharing the at least one of the plurality of tiles and the connected advertisement between the first and second user;
    maintaining the connection between the connected advertisement and the at least one of the plurality of tiles while sharing the at least one of the plurality of tiles among a plurality of interfaces and a plurality of users; and
    displaying the same tile connected advertisement connected to the at least one of the plurality of tiles to the plurality of users in a window outside the display of the content of the at least one of the plurality of tiles.

2. The computer-implemented method of claim 1, wherein the connection between the advertisement and the at least one of the plurality of tiles is one of:
    a link; and
    an attachment.

3. The computer-implemented method of claim 1 further comprising providing a robot to populate the interactive wall in response to a user selection of a domain.

4. The computer-implemented method of claim 1 further comprising providing a filter to display search results as a plurality of tiles in response to a user supplied search query.

5. The computer-implemented method of claim 1, wherein arranging the plurality of tiles on an interactive wall includes rearranging the plurality of tiles on the interactive wall in response to user input.

6. The computer-implemented method of claim 1 further comprising monetizing the advertisement connected to at least one of the plurality of tiles.

7. The computer-implemented method of claim 6, wherein monetizing comprises displaying a donate button as the at least one included graphical icon on the at least one of the plurality of tiles in response to user activation, the button displayed whenever at least one of the plurality of tiles is accessed.

8. The computer-implemented method of claim 6, wherein monetizing the advertisement comprises computing a shared revenue amount collected through revenue sharing option in response to user distribution of the at least one of the plurality of tiles.

9. The computer-implemented method of claim 6, wherein monetizing comprises enabling direct sales of products displayed on at least one of the plurality of tiles in response to the user specifying pricing and delivery options.

10. The computer-implemented method of claim 1, further comprising:
    extracting features from at least one audio component of the multimedia content connected to at least one of the plurality of tiles; and
    applying visual effects to animate an image of the multimedia content connected to at least one of the plurality of tiles using the extracted features.

11. The computer-implemented method of claim 10, wherein visual effects include one of:
    a particle animation;
    a light animation;
    a morphing avatar.

12. The computer-implemented method of claim 10, wherein the at least one audio component includes one of:
    a beat of a song;
    a beat of a mix;
    a beat of a remix;
    an audio book; and
    a sound from a video.

13. The computer-implemented method of claim 10 further comprising converting the image to simulated particles and moving the simulated particles in response to simulated forces.

14. The computer-implemented method of claim 13, wherein extracting features from the audio component comprises one of:
    processing the audio component as it plays and extract features in real time;
    compiling a feature list ahead of time by allowing a user to listen to the audio component and providing a graphical user interface (GUI) for enabling the user to mark features; and
    pre-analyzing the audio component.

15. The computer-implemented method of claim 14, wherein moving the particles in response to forces comprises:
    synchronizing the extracted features in a queue with the audio component; and
    injecting the extracted features from the queue into the animation.

16. The computer-implemented method of claim 15 further comprising converting synchronized extracted features to simulated particle forces.

17. The computer-implemented method of claim 10, further comprising providing a user interface to allow a user to interact with and customize the visual effects.

18. A non-transitory computer readable medium comprising executable instructions encoded thereon operable on a computerized device to perform processing comprising:
  providing a user interface for connecting multimedia content to a plurality of tiles, the interface enabling:
    creating the plurality of tiles;
    arranging the plurality of tiles on an interactive wall;
    allowing advertisers to add an advertisement to at least one of the plurality of tiles;
    connecting the advertisement to the at least one of the plurality of tiles;
    allowing a first user to exchange and share at least one of the plurality of tiles with a different second user;
  displaying the multimedia content connected to the at least one of the plurality of tiles on the interactive wall;
  populating the interactive wall in response to a user supplied search query;
  discovering content by examining recent tile activity including the arrangement of the plurality of tiles on the interactive wall;
  accepting bids from advertisers for connecting an advertisement to at least one of the plurality of tiles;
  connecting the advertisement to the at least one of the plurality of tiles;
  exchanging and sharing the at least one of the plurality of tiles and the connected advertisement between the first and second user;
  maintaining the connection between the connected advertisement to and the at least one of the plurality of tiles while sharing the at least one of the plurality of tiles among a plurality of interfaces and a plurality of users; and
  displaying the same tile connected advertisement connected to the at least one of the plurality of tiles to the plurality of users in a window outside the display of the content of the at least one of the plurality of tiles.

19. A computer system comprising:
  a processor;
  a memory unit that stores instructions associated with an application executed by the processor; and
  an interconnect coupling the processor and the memory unit, enabling the computer system to execute the application and perform operations of:
  providing a user interface for connecting multimedia content to a plurality of tiles, the interface enabling:
    creating the plurality of tiles;
    arranging the plurality of tiles on an interactive wall;
    allowing advertisers to add an advertisement to at least one of the plurality of tiles;
    connecting the advertisement to the at least one of the plurality of tiles;
    allowing a first user to exchange and share at least one of the plurality of tiles with a different second user;
  displaying the multimedia content connected to the at least one of the plurality of tiles on the interactive wall;
  populating the interactive wall in response to a user supplied search query;
  discovering content by examining recent tile activity including the arrangement of the plurality of tiles on the interactive wall;
  accepting bids from advertisers for connecting an advertisement to at least one of the plurality of tiles;
  connecting the advertisement to the at least one of the plurality of tiles;
  exchanging and sharing the at least one of the plurality of tile and the connected advertisement between the first and second user;
  maintaining the connection between the connected advertisement and the at least one of the plurality of tiles while sharing the at least one of the plurality of tiles among a plurality of interfaces and a plurality of users; and
  displaying the same tile connected advertisement connected to the at least one of the plurality of tiles to the plurality of users in a window outside the display of the content of the at least one of the plurality of tiles.

20. A computer-implemented method of presenting and sharing multimedia content comprising:
  providing a user interface for connecting the multimedia content to a plurality of tiles, the interface enabling:
    creating the plurality of tiles;
    arranging the plurality of tiles on an interactive wall;
    connecting an advertisement to at least one of the plurality of tiles;
    allowing a first user to exchange and share at least one of the plurality of tiles among a plurality of interfaces and a plurality of users;
  displaying the multimedia content connected to the at least one of the plurality of tiles on the interactive wall;
  accepting bids from advertisers for connecting the advertisement to at least one of the plurality of tiles;
  connecting the advertisement to at least one of the plurality of tiles;
  exchanging and sharing the at least one of the plurality of tiles and the connected advertisement between the first user and the plurality of interfaces and the plurality of users;
  maintaining the connection between the connected advertisement and the at least one of the plurality of tiles while sharing the at least one of the plurality of tiles among the plurality of interfaces and the plurality of users; and
  displaying the same tile connected advertisement in a window outside the display of the content of the at least one of the plurality of tiles when the at least one of the plurality of tiles is accessed.

* * * * *